(12) United States Patent
Sakurai et al.

(10) Patent No.: US 10,769,534 B2
(45) Date of Patent: Sep. 8, 2020

(54) EVALUATION TARGET OF INTEREST EXTRACTION APPARATUS AND PROGRAM

(71) Applicants: Kabushiki Kaisha Toshiba, Minato-ku (JP); Toshiba Solutions Corporation, Minato-ku (JP)

(72) Inventors: Shigeaki Sakurai, Tokyo (JP); Kyoko Makino, Kawasaki (JP); Hiroyuki Suzuki, Tokyo (JP)

(73) Assignees: Kabushiki Kaisha Toshiba, Minato-ku (JP); Toshiba Solutions Corporation, Minato-ku (JP)

( * ) Notice: Subject to any disclaimer, the term of this patent is extended or adjusted under 35 U.S.C. 154(b) by 521 days.

(21) Appl. No.: 14/098,076

(22) Filed: Dec. 5, 2013

(65) Prior Publication Data
US 2014/0095424 A1   Apr. 3, 2014

Related U.S. Application Data

(63) Continuation of application No. PCT/JP2012/064189, filed on May 31, 2012.

(30) Foreign Application Priority Data

Jun. 7, 2011   (JP) .................................. 2011-127432

(51) Int. Cl.
*G06N 5/02* (2006.01)
*G06Q 40/06* (2012.01)

(52) U.S. Cl.
CPC .............. *G06N 5/02* (2013.01); *G06Q 40/06* (2013.01)

(58) Field of Classification Search
CPC ................................. G06N 5/02; G06Q 40/06
See application file for complete search history.

(56) References Cited

U.S. PATENT DOCUMENTS

| 7,464,060 B2 | 12/2008 | Suyama et al. |
| 7,774,338 B2 | 8/2010 | Nomiyama et al. |

(Continued)

FOREIGN PATENT DOCUMENTS

| CN | 1402153 A | 3/2003 |
| CN | 1442803 A | 9/2003 |

(Continued)

OTHER PUBLICATIONS

Fung, Gabriel Pui Cheong, Jeffrey Xu Yu, and Wai Lam. "Stock prediction: Integrating text mining approach using real-time news." Computational Intelligence for Financial Engineering, 2003. Proceedings. 2003 IEEE International Conference on. IEEE, 2003.*

(Continued)

*Primary Examiner* — Miranda M Huang
*Assistant Examiner* — Kevin W Figueroa
(74) *Attorney, Agent, or Firm* — Oblon, McClelland, Maier & Neustadt, L.L.P.

(57) ABSTRACT

An evaluation target of interest extraction apparatus of one embodiment extracts a plurality of items for each piece of text information. When the items include an item which matches an evaluation target expression or related expression, the apparatus allocates the evaluation target expression or that of the related expression to the text information as an evaluation target item. The apparatus distinguishes a class from a change in numeric information related to the evaluation target item, and allocates the class to the text information. The apparatus generates a class-attached transaction including the evaluation target item, the items, and the class. The apparatus discovers a pattern from a set of the transactions.

3 Claims, 14 Drawing Sheets

(56) References Cited

U.S. PATENT DOCUMENTS

| | | |
|---|---|---|
| 8,285,619 B2 | 10/2012 | Herz et al. |
| 2003/0041062 A1 | 2/2003 | Isoo et al. |
| 2003/0135445 A1 | 7/2003 | Herz et al. |
| 2003/0172349 A1 | 9/2003 | Katayama et al. |
| 2006/0129554 A1 | 6/2006 | Suyama et al. |
| 2007/0078834 A1 | 4/2007 | Nomiyama et al. |
| 2008/0086436 A1 | 4/2008 | Zhao et al. |
| 2009/0144618 A1 | 6/2009 | Nomiyama et al. |
| 2012/0179682 A1* | 7/2012 | De Saeger ........ G06F 17/30401 707/737 |
| 2012/0226645 A1* | 9/2012 | O'Rourke .............. G06Q 40/06 706/46 |
| 2013/0030981 A1* | 1/2013 | Herz ..................... G06Q 40/06 705/37 |

FOREIGN PATENT DOCUMENTS

| | | |
|---|---|---|
| JP | 10-320469 A | 12/1998 |
| JP | 2001-216311 A | 8/2001 |
| JP | 2002-207755 A | 7/2002 |
| JP | 2002-251590 A | 9/2002 |
| JP | 2005-100221 A | 4/2005 |
| JP | 2006-155404 A | 6/2006 |
| JP | 2007-102289 A | 4/2007 |

OTHER PUBLICATIONS

Singapore Search and Examination Report dated Sep. 16, 2014 in Singapore Patent Application No. 201309121-0 (submitting English language translation only).

International Search Report dated Aug. 14, 2012 for PCT/JP2012/064189 filed on May 31, 2012 with English Translation.

International Written Opinion dated Aug. 14, 2012 for PCT/JP2012/064189 filed on May 31, 2012.

Rakesh Agrawal, et al., "Fast Algorithms for Mining Association Rules", $20^{th}$ VLDB Conference Santiago, Chile, 1994.

Shigeki Sakurai, "Discovery of Frequent Patterns from Item Sets with their Classes", The $24^{th}$ Annual Conference of the Japanese Society for Artificial Intelligence, 2010, 2A3-4, <https://kaigi.org/jsai/webrogram/2010/pdf/10.pdf>.

Extended European Search Report dated Jun. 3, 2015 in Patent Application No. 12796503.6.

Combined Office Action and Search Report dated Feb. 3, 2016 in Chinese Patent Application No. 201280013764.3 (with English language translation).

* cited by examiner

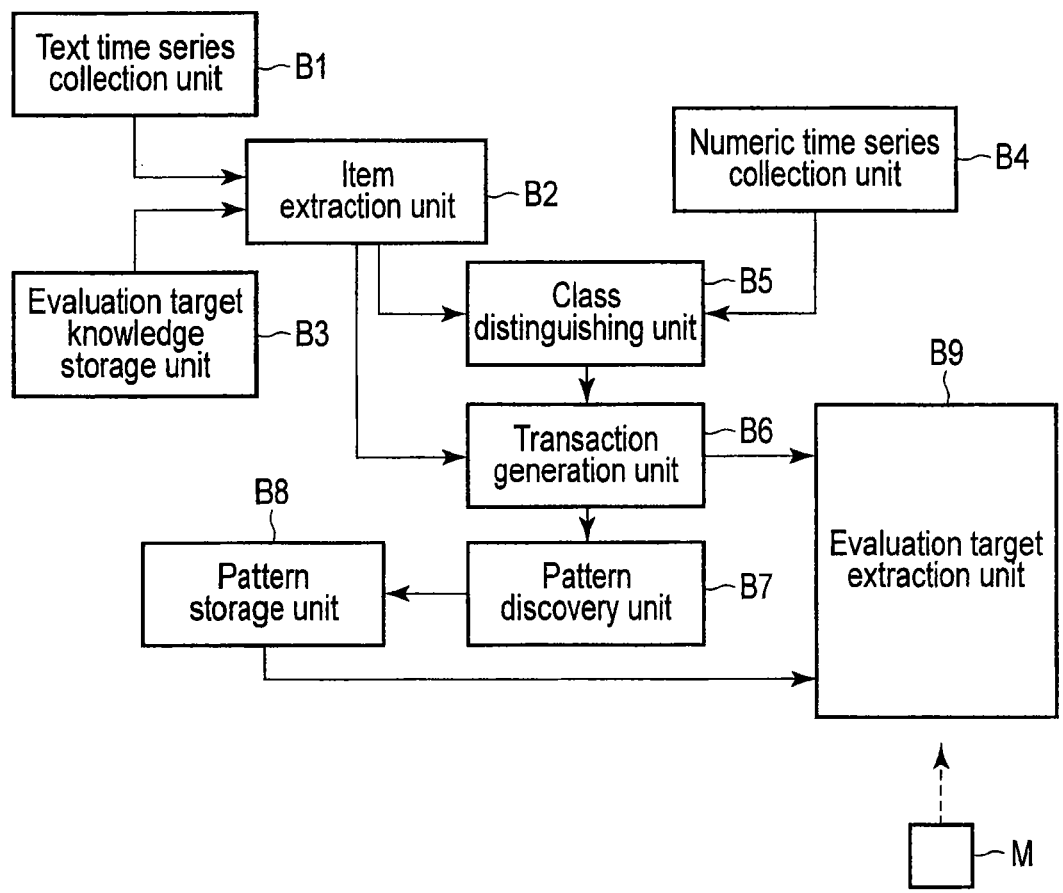
F I G. 1

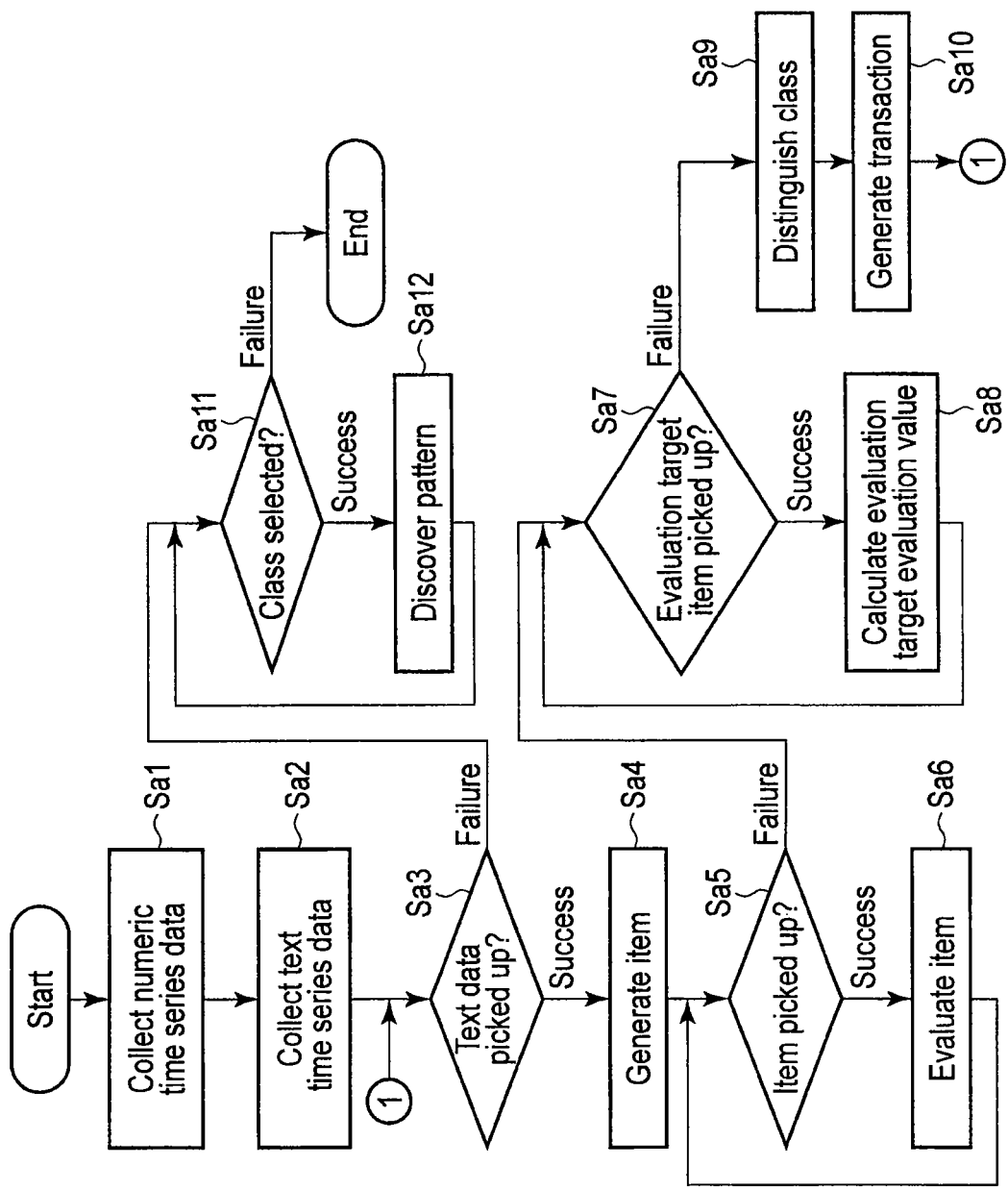
F I G. 2

| Numeric time series data (A社 (Company A)) |||
|---|---|---|
| Issue code | Date | Opening price |
| aaaa | 2010/4/20 | 900 |
| aaaa | 2010/4/21 | 899 |
| aaaa | 2010/4/22 | 901 |
| aaaa | 2010/4/23 | 887 |
| aaaa | 2010/4/26 | 902 |
| aaaa | 2010/4/27 | 903 |
| aaaa | 2010/4/28 | 886 |
| aaaa | 2010/4/30 | 898 |
| aaaa | 2010/5/6 | 884 |
| aaaa | 2010/5/7 | 844 |
| aaaa | 2010/5/10 | 844 |
| aaaa | 2010/5/11 | 873 |
| aaaa | 2010/5/12 | 867 |
| aaaa | 2010/5/13 | 868 |
| aaaa | 2010/5/14 | 848 |
| aaaa | 2010/5/17 | 830 |
| aaaa | 2010/5/18 | 842 |
| aaaa | 2010/5/19 | 814 |
| aaaa | 2010/5/20 | 827 |
| aaaa | 2010/5/21 | 790 |
| aaaa | 2010/5/24 | 807 |
| aaaa | 2010/5/25 | 829 |
| aaaa | 2010/5/26 | 826 |
| aaaa | 2010/5/27 | 802 |
| aaaa | 2010/5/28 | 827 |
| aaaa | 2010/5/31 | 816 |

F I G. 3

| | | Text time series data |
|---|---|---|
| T1 | 2010/4/26 | a社、会計ソフトの予約先行販売を開始<br>(Company a starts pre-order sale of accounting software) |
| T2 | 2010/4/28 | 明日からのGWは全国的に晴れ<br>(GW starting tomorrow will be sunny nationwide) |
| T3 | 2010/4/28 | 牛めし特売セールをg社が明日から実施<br>(Company g will have beef-on-rice special sale starting tomorrow) |
| T4 | 2010/4/29 | b社 vs c社、都市対抗野球で激突<br>(Company b and Company c fight in inter-city baseball) |
| T5 | 2010/4/29 | 10周年を記念した特別モデルをH社が販売<br>(Company H releases 10th anniversary special model) |
| T6 | 2010/4/29 | a社、会計ソフト販売を開始<br>(Company a starts sale of accounting software) |
| T7 | 2010/4/30 | 鶏肉の原産地表示の偽装疑惑発覚<br>(Suspicion of disguised place of origin indication of chicken uncovered) |
| T8 | 2010/4/30 | GWの渋滞例年並 (Traffic snarl-up on GW as usual) |
| T9 | 2010/4/30 | x車種のウィンカー、太陽光劣化でリコール<br>(Recall of x model is announced due to solar degradation of blinkers) |
| T10 | 2010/4/30 | i社、ハイエンドサーバーに、音声認識機能を搭載<br>(Company i releases high-end server with speech recognition function) |
| T11 | 2010/4/30 | 円高を受けてj社株式最高値<br>(Due to strong yen, stock of Company j reached day high) |
| T12 | 2010/5/1 | f社、セキュリティソフト制作会社を買収<br>(Company f took over security software production company) |
| | | ... |
| Tn | 2010/5/27 | k社とl社、地方販売で連携<br>(Company k and Company l partner up in regional sale) |

FIG. 4

| | Item set |
|---|---|
| I1 | a社(Company a), 会計(accounting), 予約(pre-order), ソフト(software), 先行(pre-), 販売(sale), 開始(starts) |
| I2 | 明日(tomorrow), GW(GW), 全国(nationwide), 晴れ(sunny) |
| I3 | 牛めし(beef-on-rice), 特売(special sale), セール(sale), g社(Company g), 明日(tomorrow), 実施(starting) |
| I4 | b社(Company b), c社(Company c), 都市(city), 対抗(inter-), 野球(baseball), 激突(fight) |
| I5 | 10周年(10th anniversary), 記念(anniversary), 特別(special), モデル(model), h社(Company h), 発売(releases) |
| I6 | a社(Company a), 会計(accounting), ソフト(software), 発売(sale), 開始(starts) |
| I7 | 鶏肉(chicken), 原産地(place of origin), 表示(indication), 偽装(disguised), 疑惑(Suspicion), 発覚(uncovered) |
| I8 | GW(GW), 渋滞(Traffic snarl-up), 例年(usual), 並(as) |
| I9 | x車種(x model), ウインカー(blinkers), 太陽光(solar), 劣化(degradation), リコール(Recall) |
| I10 | i社(Company i), ハイエンド(high-end), サーバー(server), 音声(speech), 認識(recognition), 機能(function), 搭載(releases) |
| I11 | 円高(strong yen), j社(Company j), 株式(stock), 最高値(day high) |
| I12 | f社(Company f), セキュリティ(security), ソフト(software), 制作(production), 会社(company), 買収(took over) |
| ... | ... |
| In | k社(Company k), l社(Company l), 地方(regional), 販売(sale), 連携(partner up) |

FIG. 5

| Evaluation target expression | Related expression |
|---|---|
| A社(Company A) | A社、a社 (Company A, Company a) |
| B社(Company B) | B社、b社 (Company B, Company b) |
| C社(Company C) | C社、c社 (Company C, Company c) |
| D1社(Company D1) | D1社、d1社、鶏肉 (Company D1, Company d1, chicken) |
| D2社(Company D2) | D2社、d2社、鶏肉 (Company D2, Company d2, chicken) |
| D3社(Company D3) | D3社、d3社、鶏肉 (Company D3, Company d3, chicken) |
| E社(Company E) | E社、e社、x車種 (Company E, Company e, x model) |
| F社(Company F) | F社、f社 (Company F, Company f) |
| G社(Company G) | G社、g社 (Company G, Company g) |
| H社(Company H) | H社、h社 (Company H, Company h) |
| I社(Company I) | I社、i社 (Company I, Company i) |
| J社(Company J) | J社、j社 (Company J, Company j) |
| K社(Company K) | K社、k社 (Company K, Company k) |
| L社(Company L) | L社、l社 (Company L, Company l) |

F I G. 6

| Numeric time series data (K社 (Company K)) |||
| --- | --- | --- |
| Issue code | Date | Opening price |
| kkkk | 2010/4/20 | 858 |
| kkkk | 2010/4/21 | 850 |
| kkkk | 2010/4/22 | 850 |
| kkkk | 2010/4/23 | 851 |
| kkkk | 2010/4/26 | 870 |
| kkkk | 2010/4/27 | 862 |
| kkkk | 2010/4/28 | 849 |
| kkkk | 2010/4/30 | 825 |
| kkkk | 2010/5/6 | 825 |
| kkkk | 2010/5/7 | 859 |
| kkkk | 2010/5/10 | 877 |
| kkkk | 2010/5/11 | 858 |
| kkkk | 2010/5/12 | 870 |
| kkkk | 2010/5/13 | 870 |
| kkkk | 2010/5/14 | 873 |
| kkkk | 2010/5/17 | 877 |
| kkkk | 2010/5/18 | 875 |
| kkkk | 2010/5/19 | 869 |
| kkkk | 2010/5/20 | 866 |
| kkkk | 2010/5/21 | 868 |
| kkkk | 2010/5/24 | 863 |
| kkkk | 2010/5/25 | 888 |
| kkkk | 2010/5/26 | 899 |
| kkkk | 2010/5/27 | 802 |
| kkkk | 2010/5/28 | 888 |
| kkkk | 2010/5/31 | 816 |

FIG. 7

| Numeric time series data (L社 (Company L)) |||
|---|---|---|
| Issue code | Date | Opening price |
| IIII | 2010/4/20 | 924 |
| IIII | 2010/4/21 | 928 |
| IIII | 2010/4/22 | 933 |
| IIII | 2010/4/23 | 953 |
| IIII | 2010/4/26 | 953 |
| IIII | 2010/4/27 | 964 |
| IIII | 2010/4/28 | 957 |
| IIII | 2010/4/30 | 952 |
| IIII | 2010/5/6 | 948 |
| IIII | 2010/5/7 | 928 |
| IIII | 2010/5/10 | 927 |
| IIII | 2010/5/11 | 930 |
| IIII | 2010/5/12 | 927 |
| IIII | 2010/5/13 | 930 |
| IIII | 2010/5/14 | 934 |
| IIII | 2010/5/17 | 937 |
| IIII | 2010/5/18 | 943 |
| IIII | 2010/5/19 | 936 |
| IIII | 2010/5/20 | 950 |
| IIII | 2010/5/21 | 937 |
| IIII | 2010/5/24 | 936 |
| IIII | 2010/5/25 | 932 |
| IIII | 2010/5/26 | 920 |
| IIII | 2010/5/27 | 914 |
| IIII | 2010/5/28 | 915 |
| IIII | 2010/5/31 | 926 |

F I G. 8

Class allocation result

| T1 | Down |
|----|------|
| T2 |      |
| T3 | Up |
| T4 | Down |
| T5 | Up |
| T6 | Average |
| T7 | Down |
| T8 |      |
| T9 | Down |
| T10 | Up |
| T11 | Up |
| T12 | Down |
| ... | ... |
| Tn | Up |

F I G. 9

| | Transaction | |
|---|---|---|
| C1 | A社, a社, 会計, 予約, ソフト, 先行, 販売, 開始<br>(Company A, Company a, accounting, pre-order, software, pre-, sale, starts) | Down |
| C2 | 明日, GW, 全国, 晴れ<br>(tomorrow, GW, nationwide, sunny) | |
| C3 | G社, 牛めし, 特売, セール, g社, 明日, 実施<br>(Company G, beef-on-rice, special sale, sale, Company g, tomorrow, starting) | Up |
| C4 | B社, C社, b社, c社, 都市, 対抗, 野球, 激突<br>(Company B, Company C, Company b, Company c, city, inter-, baseball, fight) | Down |
| C5 | H社, 10周年, 記念, 特別, モデル, h社, 発売<br>(Company H, 10th anniversary, anniversary, special, model, Company h, releases) | Up |
| C6 | A社, a社, 会計, ソフト, 発売, 開始<br>(Company A, Company a, accounting, software, sale, starts) | Average |
| C7 | D1社, D2社, D3社, 鶏肉, 原産地, 表示, 偽装, 疑惑, 発覚<br>(Company D1, Company D2, Company D3, chicken, place of origin, indication, disguised, Suspicion, uncovered) | Down |
| C8 | GW, 渋滞, 例年, 並 (GW, Traffic snarl-up, usual, as) | |
| C9 | x 車種, ウィンカー, 太陽光, 劣化, リコール<br>(x model, blinkers, solar, degradation, Recall) | Down |
| C10 | I社, i社, ハイエンド, サーバー, 音声, 認識, 機能, 搭載<br>(Company i, Company i, high-end, server, speech, recognition, function, releases) | Up |
| C11 | J社, 円高, j社, 株式, 最高値<br>(Company J, strong yen, Company j, stock, day high) | Up |
| C12 | F社, f社, セキュリティ, ソフト, 制作, 会社, 買収<br>(Company F, Company f, security, software, production, company, took over) | Down |
| | ... | |
| Cn | K社, L社, k社, l社, 地方, 販売, 連携<br>(Company K, Company L, Company k, Company l, regional, sale, partner up) | Up |

FIG. 10

|      | Pattern |  |
|------|---------|---|
| up1  | (I社、サーバー) | (Company I, server) |
| up2  | (I社、搭載) | (Company I, releases) |
| up3  | (サーバー、搭載) | (server, releases) |
| up4  | (I社、サーバー、搭載) | (Company I, server, releases) |
| up5  | (H社、特別) | (Company H, special) |
| up6  | (J社、円高) | (Company J, strong yen) |
| up7  | (K社、L社) | (Company K, Company L) |
| up8  | (地方、販売、連携) | (regional, sale, partner up) |
| up9  | (K社、連携) | (Company K, partner up) |
| up10 | (L社、連携) | (Company L, partner up) |
| up11 | (K社、L社、連携) | (Company K, Company L, partner up) |

FIG. 11

|      | Pattern |  |
|------|---------|---|
| dw1  | (E社、リコール) | (Company E, Recall) |
| dw2  | (D1社、原産地) | (Company D1, place of origin) |
| dw3  | (D1社、偽装) | (Company D1, disguised) |
| dw4  | (D1社、原産地、偽装) | (Company D1, place of origin, disguised) |
| dw5  | (原産地、偽装) | (place of origin, disguised) |
| dw6  | (C社、更生) | (Company C, reorganization) |
| dw7  | (F社、買収) | (Company F, took over) |

FIG. 12

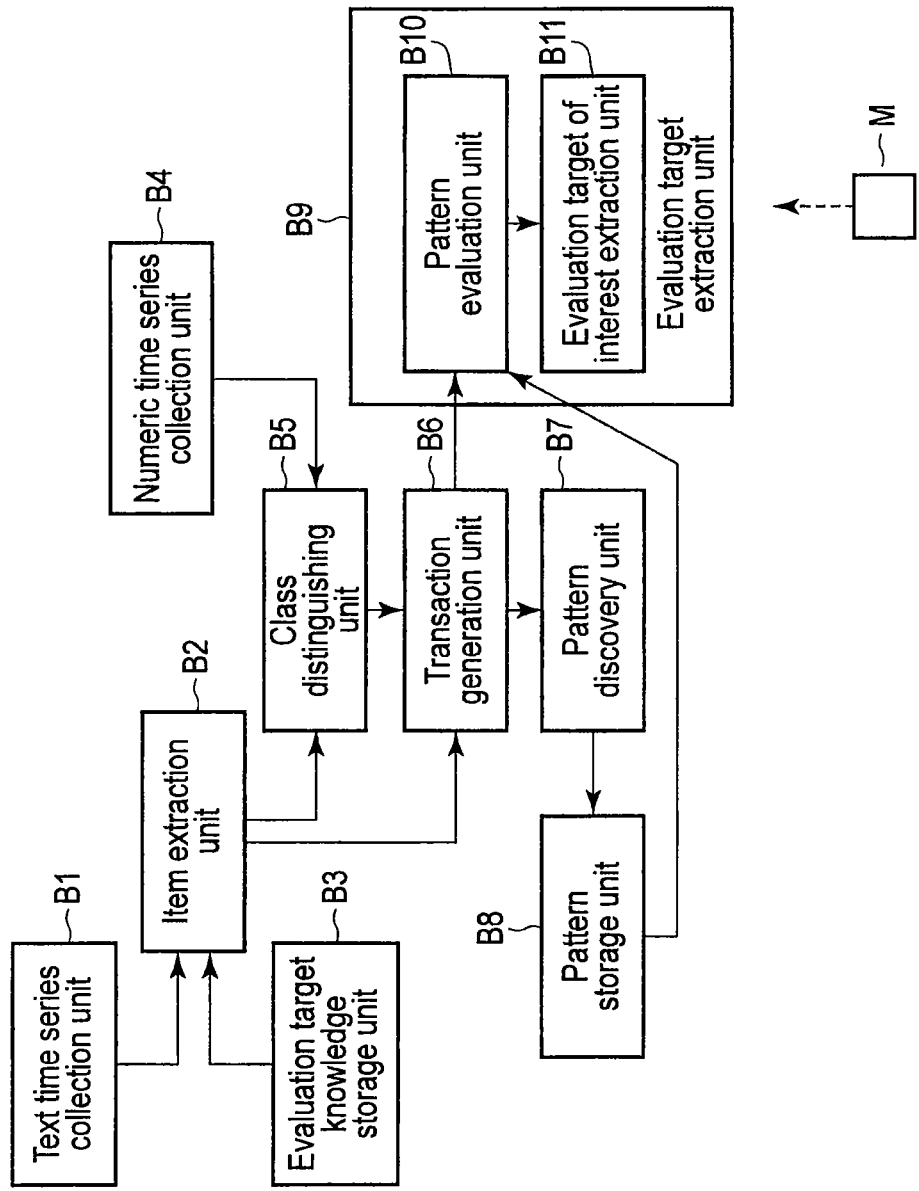
F I G. 13

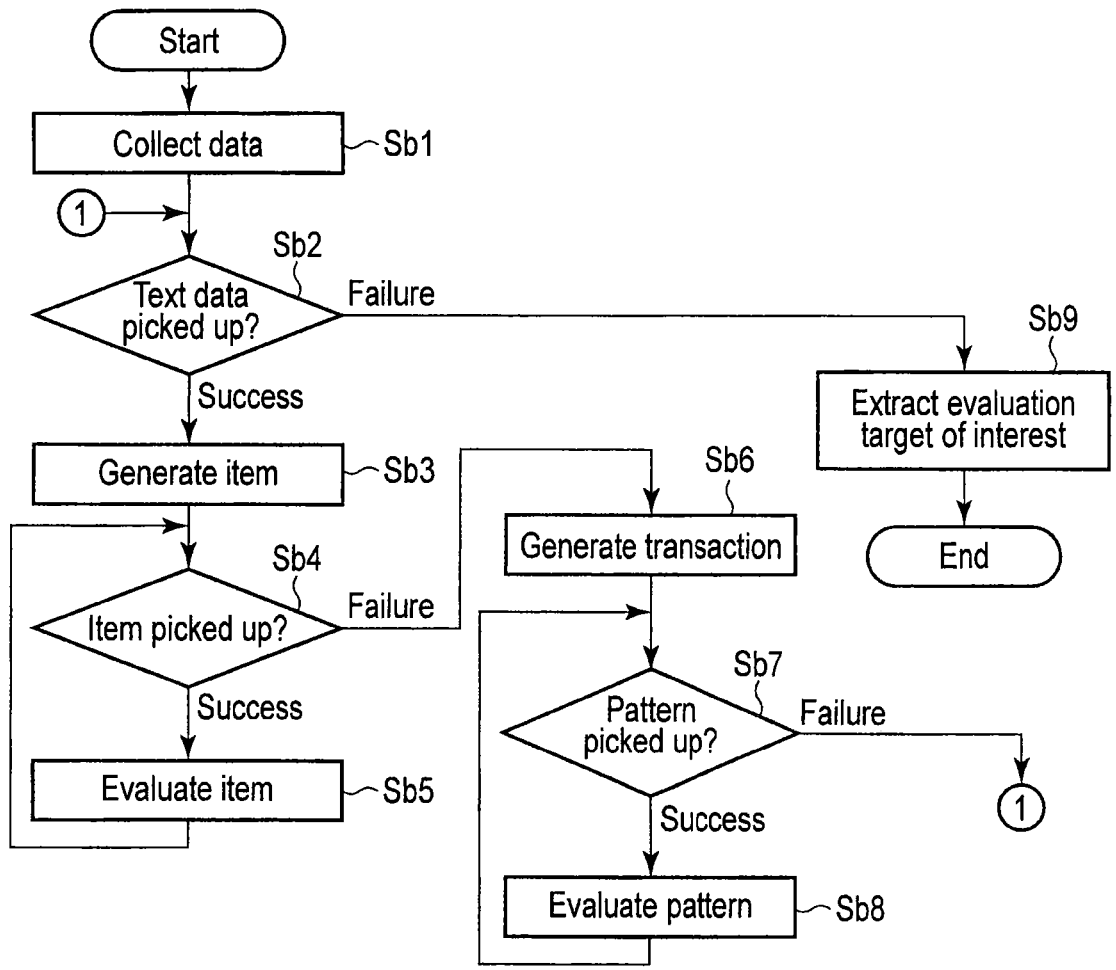

FIG. 14

| | | Text time series data |
|---|---|---|
| E1 | 2010/6/10 | i社、ミドルエンドサーバーにも音声認識機能の搭載<br>(Company i also releases middle-end server with speech recognition function) |
| E2 | 2010/6/10 | 関東地方梅雨入りを宣言<br>(Declare start of rainy season in Kanto area) |
| E3 | 2010/6/10 | d2社にも原産地偽装疑惑拡大<br>(Place of origin disguised suspicion spread to Company d2) |
| ... | | |
| Em | 2010/6/10 | d3社とj社、地方で販売での連携に合意<br>(Company d3 and Company j agree on partnership in regional sale) |

FIG. 15

| | Transaction | |
|---|---|---|
| F1 | 2010/6/10 | I社、i社、ミドル、エンド、サーバー、音声、認識、機能、搭載<br>(Company I, Company i, middle, end, server, speech, recognition, function, releases) |
| F2 | 2010/6/10 | 関東、地方、梅雨、入り、宣言<br>(Kanto, area, rainy season, start of, Declare) |
| F3 | 2010/6/10 | D2社、d2社、原産地、偽装、疑惑、拡大<br>(Company D2, Place of origin, disguised, suspicion, spread) |
| ... | | |
| Fm | 2010/6/10 | D3社、J社、d3社、j社、地方、販売、連携、合意<br>(Company D3, Company J, Company d3, Company j, regional, sale, partnership, agree) |

F I G. 16

Frequency of occurrence data

| Evaluation target | Frequency of occurrence: up | Frequency of occurrence: down |
|---|---|---|
| A社(Company A) | 2 | 3 |
| B社(Company B) | 4 | 4 |
| C社(Company C) | 1 | 5 |
| D1社(Company D1) | 2 | 6 |
| D2社(Company D2) | 1 | 16 |
| D3社(Company D3) | 20 | 1 |
| E社(Company E) | 0 | 2 |
| F社(Company F) | 0 | 3 |
| G社(Company G) | 1 | 4 |
| H社(Company H) | 1 | 6 |
| I社(Company I) | 15 | 2 |
| J社(Company J) | 10 | 1 |
| K社(Company K) | 5 | 2 |
| L社(Company L) | 0 | 1 |

F I G. 17

EVALUATION TARGET OF INTEREST EXTRACTION APPARATUS AND PROGRAM

CROSS-REFERENCE TO RELATED APPLICATIONS

This application is based upon and claims the benefit of priority from Japanese Patent Application No. 2011-127432, filed on Jun. 7, 2011; the entire contents of which are incorporated herein by reference.

FIELD

Embodiments described herein relate generally to an evaluation target of interest extraction apparatus and program.

BACKGROUND

In a computer and network environment, numeric time series data can be collected for a specific target, and text time series data can be acquired for the specific target. In such environment, a method of discovering a pattern which explains a variation of the numeric time series data by the text time series data, and predicting an evaluation target of interest in the next term based on the numeric time series data and text time series data has been studied.

For example, in the stock market, by considering stock prices as numeric time series data, and news articles related to brands as text time series data, a method of discovering a pattern which is extracted from news articles to explain a variation of stock prices, notifying a user of a brand of interest in the next term, and supporting decision-making related to sales by brand of the user has been studied.

As a method of predicting an evaluation target, for example, two methods have been proposed.

The first method characterizes an evaluation target in advance by explicitly given attribute values, generates time series data based on frequencies of events related to occurrence of the evaluation target, and calculates a degree of importance of the evaluation target or those of the attribute values of the evaluation target, so as to extract an important evaluation target in a specific problem domain.

On the other hand, the second method visually recognizably displays the relationship between an evaluation target and specific words to the user by associating the evaluation target and time-dependent changes in frequencies of occurrence of specific words with each other.

However, the aforementioned two methods normally do not pose any problem, but they suffer the following disadvantages according to the examinations of the present inventor.

For example, the first method cannot handle an evaluation target which cannot be characterized in advance since an evaluation target is characterized in advance by explicit attribute values. Also, the first method limits time series data related to an evaluation target to those of events related to occurrence of the evaluation target.

On the other hand, the second method allows the user to visually recognize the relationship between an evaluation target and specific words, but it cannot automatically discover a pattern which can explain the case of occurrence of a specific relationship.

A solution to such problem of the present invention is to provide an evaluation target of interest extraction apparatus and program, which can handle an evaluation target which cannot be characterized in advance, does not limit time series data to those related to occurrence of the evaluation target, and can automatically discover a pattern.

BRIEF DESCRIPTION OF THE DRAWINGS

FIG. 1 is a block diagram showing the arrangement of an evaluation target of interest extraction apparatus according to the first embodiment.

FIG. 2 is a flowchart for explaining the operation according to the first embodiment.

FIG. 3 is a table showing an example of numeric time series data according to the first embodiment.

FIG. 4 is a table showing an example of text time series data according to the first embodiment.

FIG. 5 is a table showing an example of item sets according to the first embodiment.

FIG. 6 is a table showing an example of evaluation target knowledge according to the first embodiment.

FIG. 7 is a table showing an example of numeric time series data according to the first embodiment.

FIG. 8 is a table showing an example of numeric time series data according to the first embodiment.

FIG. 9 is a table showing an example of class allocation results according to the first embodiment.

FIG. 10 is a table showing an example of class-attached transactions according to the first embodiment.

FIG. 11 is a table showing an example of patterns according to the first embodiment.

FIG. 12 is a table showing an example of patterns according to the first embodiment.

FIG. 13 is a block diagram showing the arrangement of an evaluation target of interest extraction apparatus according to the second embodiment.

FIG. 14 is a flowchart for explaining the operation according to the second embodiment.

FIG. 15 is a table showing an example of text time series data according to the second embodiment.

FIG. 16 is a table showing an example of item sets according to the second embodiment.

FIG. 17 is a table showing an example of evaluation results of text time series data according to the second embodiment.

DETAILED DESCRIPTION

In general, according to one embodiment, an evaluation target of interest extraction apparatus is an apparatus which can discover a pattern before an evaluation target of interest is extracted based on the pattern from a plurality of pieces of text information which are given along a time series and are related to a plurality of evaluation targets.

The evaluation target of interest extraction apparatus comprises a text collection device, a numeric collection device, a target expression storage device, an item allocation device, a class distinguishing device, a transaction generation device, a pattern discovery device, and a pattern storage device.

The text collection device collects the plurality of pieces of text information.

The numeric collection device collects numeric information individually related to each evaluation target.

The target expression storage device stores an evaluation target expression which individually expresses each evaluation target, and a related expression which expresses a target individually related to each evaluation target in association with each other.

The item allocation device extracts a plurality of items for each piece of collected text information, and when the items include an item that matches the evaluation target expression or the related expression, the item allocation device allocates the evaluation target expression or an evaluation target expression associated with the related expression in the target expression storage device to the text information as an evaluation target item.

The class distinguishing device distinguishes a class related to a change in numeric information based on the numeric information related to an evaluation target expressed by the evaluation target expression as the evaluation target item, and allocates the class to text information to which the evaluation target item is allocated.

The transaction generation device generates, for each piece of collected text information, a class-attached transaction including the allocated evaluation target item, the extracted items, and the allocated class.

The pattern discovery device discovers the pattern indicating a combination of characteristic items from a set of the transactions.

The pattern storage device stores the discovered pattern.

Embodiments will be described hereinafter with reference to the drawings. Note that an evaluation target of interest extraction apparatus to be described below can be implemented by either a hardware arrangement or a combined arrangement of hardware resources and software. As the software of the combined arrangement, a program, which is installed from a network or non-transitory computer-readable storage medium M in a computer in advance, and is executed by a processor of the computer to control the computer to implement functions of the evaluation target of interest extraction apparatus, as shown in FIGS. 1 and 13, is used.

First Embodiment

FIG. 1 is a block diagram showing the arrangement of an evaluation target of interest extraction apparatus according to the first embodiment. This evaluation target of interest extraction apparatus can discover a pattern before it extracts an evaluation target of interest based on a pattern from a plurality of pieces of text information which are given along a time series and are related to a plurality of evaluation targets.

More specifically, the evaluation target of interest extraction apparatus includes a text time series collection unit B1, item extraction unit B2, evaluation target knowledge storage unit B3, numeric time series collection unit B4, class distinguishing unit B5, transaction generation unit B6, pattern discovery unit B7, pattern storage unit B8, and evaluation target extraction unit B9. That is, the evaluation target of interest extraction apparatus can discover a pattern by the respective units B1 to B8 before it extracts an evaluation target of interest by the evaluation target extraction unit B9.

Note that the text time series collection unit (text collection device) B1 has a function of collecting a plurality of pieces of text information which are given along a time series and are related to a plurality of evaluation targets. Note that "text information" may also be referred to as "text time series data".

The item extraction unit (item allocation device) B2 has a function of extracting a plurality of items for each piece of text information collected by the text time series collection unit B1, and allocating, when the items include an item which matches an evaluation target expression or related expression in the evaluation target knowledge storage unit B3, that evaluation target expression or an evaluation target expression which is associated with the related expression in the evaluation target knowledge storage unit B3, to the text information as an evaluation target item.

The evaluation target knowledge storage unit (target expression storage device) B3 is a storage device which is read/write accessible from the respective units B1, B2, B4 to B7, and B9, and stores an evaluation target expression which individually expresses each evaluation target and a related expression which expresses a target individually related to each evaluation target in association with each other. For example, in the evaluation target knowledge storage unit B3, a control unit (not shown) writes, in advance, evaluation target knowledge which describes an evaluation target expression and related expression in association with each other. Note that in the evaluation target knowledge storage unit B3, evaluation target knowledge described in advance in a part of a program of the evaluation target of interest extraction apparatus may be written from the control unit at an activation timing, or described evaluation target knowledge may be written according to a user operation.

The numeric time series collection unit (numeric collection device) B4 has a function of collecting numeric information individually related to each evaluation target. Note that "numeric information" may also be referred to as "numeric information which is given along a time series and is individually related to each evaluation target" or "numeric time series data". Also, time series data including "text time series data" and "numeric time series data" may be referred to as "composite event time series data".

The class distinguishing unit B5 has a function of distinguishing a class based on numeric information related to an evaluation target expressed by an evaluation target expression as an evaluation target item allocated by the item extraction unit B2, and allocating the class to text information to which the evaluation target item is allocated.

The transaction generation unit B6 has a function of generating, for each text information collected by the text time series collection unit B1, a transaction including an evaluation target item allocated by the item extraction unit B2, items extracted by the item extraction unit B2, and a class allocated by the class distinguishing unit B5.

The pattern discovery unit B7 has a function of discovering a pattern indicating a combination of characteristic items from a set of transactions generated by the transaction generation unit B6. Note that the "combination of characteristic items" may also be referred to as a "combination of items having high frequencies of occurrence" or "combination of items of frequent occurrence". A discovered pattern is written in the pattern storage unit B8 by the pattern discovery unit B7.

The pattern storage unit B8 is a storage device which is read/write accessible from the respective units B1, B2, B4 to B7, and B9, and stores a pattern discovered by the pattern discovery unit B7. Note that different storage areas in a single storage device or different storage devices may be used as the target evaluation knowledge storage unit B3 and pattern storage unit B8.

The evaluation target extraction unit B9 has a function of extracting an evaluation target of interest by applying the pattern in the pattern storage unit B8 to the transaction generated from newly collected text information.

The operation of the evaluation target of interest extraction apparatus with the aforementioned arrangement will be described with reference to the flowchart shown in FIG. 2. In the following description, news headings will be discussed as text time series data (text information), and stock prices will be discussed as numeric time series data (numeric information). Also, company names (stock price brand names) will be discussed as evaluation targets.

In step Sa1, the numeric time series collection unit B4 collects numeric time series data indicating stock price information for each evaluation target from a Web site, which delivers stock price information, via the Internet or the like. As the numeric time series data, for example, data including an issue code, date, and opening price, as shown in FIG. 3, are used. However, numeric time series data include only data of business days of the stock market, and do not include any data related to non-bushiness days of the stock market.

In step Sa2, the text time series collection unit B1 collects text time series data including news headings from a Web site, which delivers news headings, via the Internet or the like. As text time series data, data each including a news delivery date and news heading, as shown in FIG. 4, are used.

In step Sa3, the text time series collection unit B1 picks up one text data from the collected text time series data. At this time, if text data to be picked up is available, the process advances to step Sa4; otherwise, the process advances to step Sa11. Therefore, when text time series data shown in FIG. 4 are collected, the process advances to step Sa11 when this step is executed in processing immediately after time series data Tn is picked up.

In step Sa4, the item extraction unit B2 extracts respective expressions which represent the picked-up text data as items. For example, the item extraction unit B2 applies morphological analysis to the text data to specify parts of speech of respective expressions, and extracts, as items, expressions given with nouns as a part of speech. Therefore, when morphological analysis is applied to text data of a text No. T1 to extract noun expressions, expressions "a社" (Company A), "会計" (accounting), "予約" (pre-order), "ソフト" (software), "先行" (pre-), "販売" (sale), and "開始" (starts) are extracted as items. By applying the same processing to respective text data shown in FIG. 4, item sets shown in FIG. 5 can be generated from the respective text data.

In step Sa5, one item is picked up from a set of items extracted by the item extraction unit B2. If an item to be picked up is available, the process advances to step Sa6; otherwise, the process advances to step Sa7. Therefore, in the case of data T1, the process advances to step Sa7 when this step is executed in processing immediately after an item "開始" (starts) is picked up.

In step Sa6, the item extraction unit B2 refers to evaluation target knowledge stored in the evaluation target knowledge storage unit B3 to determine whether or not the item is related to an evaluation target.

If the item extraction unit B2 determines that the item is related to an evaluation target, it allocates the evaluation target item to the text data. For example, assume that the evaluation target knowledge storage unit B3 stores evaluation target knowledge including an evaluation target expression and related expression, as shown in FIG. 6. At this time, an item "社" (Company A) is picked up from the text data of the text No. T1. Note that "text data of a text No. T○" will also be referred to as "text data T○" (suffix ○ expresses an arbitrary numeral). Likewise, an "item set of an item set No. I○" will also be referred to as an "item set I○". The item extraction unit B2 refers to the related expression of the evaluation target knowledge to determine whether or not the item is registered as the related expression. Thus, the item extraction unit B2 allocates "A 社" as an evaluation target expression corresponding to the related expression to the evaluation target item with respect to the text data T1.

Next, assume that an item "鶏肉" (chicken) is picked up from text data T7. The item extraction unit B2 refers to related expressions of the evaluation target knowledge to identify that the item is registered as related expressions in a plurality of locations. Thus, the item extraction unit B2 allocates "D1社" (Company D1), "D2社" (Company D2), and "D3社" (Company D3) as evaluation target expressions corresponding to respective related expressions to the evaluation target item with respect to the text data of the text No. T7.

On the other hand, since no corresponding related expression is available for an item "会社" (company) of text data T1 and an item "原産地" (place of origin) of text data T7, the process returns to step Say without allocating any new evaluation target item to respective text data.

In step Sa1, the class distinguishing unit B5 picks up one evaluation target item allocated to text data. At this time, if an evaluation target item to be picked up is available, the process advances to step Sa8. On the other hand, if an evaluation target item to be picked up is not available, the process advances to step Sa9. For example, if an evaluation target item "A社" (Company A) is allocated to an item set I1, the process advances to step Sa9 in processing immediately after "A社" (Company A) is picked up.

In step Sa8, the class distinguishing unit B5 refers to numeric time series data corresponding to the picked-up evaluation target item to calculate a volatility as a criterion of class determination. In this case, assume that the class distinguishing unit B5 calculates a volatility corresponding to the evaluation target item based on, for example:

$$f(it, d) = \frac{\text{value}(it, dy) - \text{value}(it, d)}{\text{value}(it, d)} \quad (1)$$

where it is an evaluation target item, d is a delivery date of text data including an evaluation target, dy is a business day y days after the delivery date d, and value( ) is a function which returns an opening price of a stock price at a designated date of the evaluation target item. However, if d is a non-business day, a business day one day before is used.

A volatility when y=2 is given will be calculated. Assume that "A社" (Company A) is picked up from an item set I1, and numeric time series data corresponding to "A社" are given, as shown in FIG. 3. At this time, "2010/4/26" can be obtained as a delivery date of text data T1 corresponding to the item set I1, and "2010/4/28" can be obtained as dy. By referring to FIG. 3, since value(A社, 2010/4/26) and value(A社, 2010/4/28) are respectively given as "902" and "886", f(A社, 2010/4/26)=(886-902)/902=-0.01774 can be obtained. Next, a case will be examined below wherein "K社" (Company K) is picked up from an item set In, and numeric time series data corresponding to "K社" are given, as shown in FIG. 7. At this time, "2010/05/27" is obtained as a delivery date of text data Tn corresponding to the item set In, and "2010/5/31" can be obtained as a business day dy y days after. By referring to FIG. 7, since value(K社, 2010/5/27) and value(K社, 2010/5/31) are respectively given as "802" and "816", f(K社, 2010/5/27)=(816-802)/802=0.05923 can be obtained. Likewise, when "L社" (Company L) is picked up from the item set In, and numeric time series data corresponding to "L社" are given, as shown in FIG. 8, f(L社, 2010/5/27)=(926-914)/914=0.01313 is given.

In step Sa9, the class distinguishing unit B5 calculates an evaluation value which combines volatilities calculated for respective items corresponding to text data, and distinguishes a class according to that evaluation value. In this case, the class distinguishing unit B5 calculates an average volatility as an average value of volatilities based on, for example:

$$\frac{1}{|T|} \cdot \sum_{it \in I} f(it, d) \quad (2)$$

where T is a set of items corresponding to text data, ∥ is a calculation for calculating the number of items included in an item set. However, assume that when an item set is an empty set, the average volatility cannot be calculated. Then, the class distinguishing unit B5 sets the average volatility as an evaluation value corresponding to text data.

If the average value is not more than a designated class distinguishing threshold Th (>0)×−1−Th, "down" is determined; if the average value is not less than Th, "up" is determined; and if the average value is larger than −Th and smaller than Th, "average" is determined. However, when the average volatility cannot be calculated, a class is not allocated.

For example, in the case of text data T1, since only one item "A社" (Company A) is allocated, an average volatility=−0.01774 is given. In the case of text data Tn, since two items "K社" (Company K) and "L社" (Company L) are allocated, an average value (0.05923+0.01313)/2=0.03618 of the two items is given as an average volatility. When a class distinguishing threshold=0.015 is given, classes "down" and "up" are respectively allocated to the text data T1 and Tn. On the other hand, since text data T2 and T8 do not include any item, and an average volatility cannot be calculated, no class is allocated.

As described above, the class distinguishing unit B5 distinguishes a class for each text data, and allocates the class, thus obtaining class allocation results to respective text data as data which represents a correspondence relationship between text data and classes, as shown in FIG. 9. However, when no class is allocated, a slash "/" is described.

In step Sa10, the transaction generation unit B6 generates a transaction by combining, from each class-attached text data, items extracted from that text data, an evaluation target item, and an allocated class. Therefore, class-attached transactions shown in FIG. 10 are generated from text data shown in FIG. 4.

In step Sa11, the pattern discovery unit B7 picks up one class from classes allocated to text data. At this time, if a class to be picked up is available, the process advances to step Sa12; otherwise, this algorithm ends. Also, assume that in this embodiment, pattern discovery is attempted from only the classes "up" and "down".

In step Sa12, the pattern discovery unit B7 extracts transactions including the designated class. Also, the pattern discovery unit B7 discovers all patterns as combinations of items of frequent occurrence having a confidence not less than a minimum confidence as a threshold related to the frequency of occurrence of a pattern using an algorithm described in a reference: R. Agrawal and R. Srikant, "Fast Algorithms for Mining Association Rules", 20th VLDB Conference (1994), and stores the discovered patterns in the pattern storage unit B8 as those corresponding to the selected class.

The pattern discovery unit B7 generates a combination of items like "I社" (Company I) and "サーバー" (server) as a pattern candidate with respect to a class "up" in the transaction shown in FIG. 10, and leaves, as patterns, pattern candidates having a frequency of occurrence higher than a reference value of the generated pattern candidates. Thus, the pattern discovery unit B7 can discover patterns indicating combinations of characteristic items, as shown in FIG. 11, and can store them in the pattern storage unit B8. Also, as for a class "down", the pattern discovery unit B7 can similarly discover patterns shown in FIG. 12 from frequencies of occurrence of pattern candidates, and can store them in the pattern storage unit B8.

The evaluation target extraction unit B9 extracts an evaluation target of interest by applying the patterns in the pattern storage unit B8 to transactions generated from newly collected text time series data.

As described above, according to this embodiment, a plurality of items are extracted from each piece of collected text information, and when an item which matches an evaluation target expression or related expression is found, the evaluation target expression or an evaluation target expression associated with the related expression is allocated as an evaluation target item to the text information, a class related to a change in numeric information related to the evaluation target item is distinguished, a class-attached transaction including an evaluation target item, items, and class is generated for each text information, and patterns indicating a combination of characteristic items are discovered from a set of transactions. With this arrangement, even when a clear correspondence relationship is not described between text information and numeric information, the text information and numeric information can be appropriately associated with each other, and a pattern which can explain a change in numeric information can be extracted from text information.

Further, according to this embodiment, an evaluation target which cannot be characterized in advance can be handled, time series data are not limited to those related to occurrence of an evaluation target, and a pattern can be automatically discovered.

In the conventional second method, an evaluation target of interest, which causes a specific relationship, cannot be predicted based on a discovered pattern. By contrast, according to this embodiment, the evaluation target extraction unit B9 evaluates new text information based on the discovered pattern, and can predict (extract) an evaluation target as an evaluation target which is more likely to cause a change in numeric information.

Second Embodiment

FIG. 13 is a block diagram showing the arrangement of an evaluation target of interest extraction apparatus according to the second embodiment. A detailed description of the same units as those in FIG. 1 will not be repeated, and only different units will be mainly described below.

That is, the second embodiment is a practical example of the first embodiment, and an evaluation target extraction unit B9 includes a pattern evaluation unit B10 and evaluation target of interest extraction unit B11. Thus, a transaction generation unit B6 has a function of generating a classless transaction, which includes evaluation target items allocated by an item extraction unit B2 and extracted items, but does not include any class described above for each text information newly collected by a text time series collection unit B1 after patterns are stored in a pattern storage unit B8. Note that a "classless transaction" may use an arbitrary name as long as it can be distinguished from a class-attached transaction (transaction for pattern discovery) used in pattern discovery. For example, the "classless transaction" may be simply referred to as a "transaction" or may be referred to as a "transaction without any class", "transaction for evaluation target of interest extraction", "new transaction", or the like.

Note that the pattern evaluation unit (pattern evaluation device) B10 has a function of evaluating whether the classless transaction includes a pattern by applying the pattern in the pattern storage unit B8 to the classless transaction. Note that "evaluation" may also be referred to as "determination".

The evaluation target of interest extraction unit (evaluation target of interest extraction device) B11 has a function of incrementing, when the pattern is included as a result of evaluation, frequencies of occurrence associated with evaluation target items in the classless transaction, and extracting evaluation target items associated with the frequencies of occurrence as evaluation targets of interest based on the increment results of the frequencies of occurrence.

The operation of the evaluation target of interest extraction apparatus with the aforementioned arrangement will be described below with reference to the flowchart shown in FIG. 14.

In step Sb1, the text time series collection unit B1 collects text time series data including news headings from a Web site, which delivers news headings, via the Internet or the like. As the text time series data, for example, as shown in FIG. 15, data including delivery dates of news and news headings are used. However, assume that a delivery date of text time series data of this embodiment is that after a collection date of text time series data used in pattern discovery by a pattern discovery unit B7.

In step Sb2, one text data is picked up from those collected by the text time series collection unit B1. At this time, if an item to be picked up is available, the process advances to step Sb3; otherwise, the process advances to step Sb9. For example, when text data shown in FIG. 15 are collected, the process advances to step Sb9 in processing immediately after text data Em is picked up.

In step Sb3, the item extraction unit B2 applies the same processing as in step Sa4 of FIG. 2 to the picked-up text data, thereby extracting items which represent the text data. Therefore, from text data E1, items "i 社" (Company i), "ミドル" (middle), "エンド" (end), "サーバー" (server), "音声" (speech), "認識" (recognition), "機能" (function), and "搭載" (releases) are extracted.

In step Sb4, the item extraction unit B2 picks up one item in turn from the extracted items. At this time, if an item to be picked up is available, the process advances to step Sb5; otherwise, the process advances to step Sb6. For example, in the case of the text data E1, the process advances to step Sb6 in processing immediately after an item "搭載" is extracted.

In step Sb5, the item extraction unit B2 applies the same processing as in step Sa6 of FIG. 2 to the picked-up item, thereby evaluating whether or not an evaluation target item corresponding to the picked-up item is available. If such evaluation target item is available, the item extraction unit B2 allocates that evaluation target item to the text data.

In step Sb6, the transaction generation unit B6 generates, for each text data, a transaction including items extracted from the text data and evaluation target text data corresponding to the text data. This processing is similar to that of step Sa10 of FIG. 2, but dissimilar to the processing of step Sa10 of FIG. 2 in that no class is allocated to each transaction. Therefore, classless transactions shown in FIG. 16 can be generated from text data shown in FIG. 15.

In step Sb7, the pattern evaluation unit B10 picks up one pattern in turn from those stored in the pattern storage unit B8. At this time, if a pattern to be picked up is available, the process advances to step Sa8; otherwise, the process returns to step Sb2.

In step Sb8, the pattern evaluation unit B10 compares the picked-up classless transaction and pattern to evaluate whether or not items included in the classless transaction include those included in the pattern. At this time, if the pattern is included, a class corresponding to the pattern is referred to, and a frequency of occurrence of an evaluation target item for each class corresponding to the transaction is incremented by "1".

For example, when a transaction F1 and pattern up4 are selected, items "I社" (Company I), "サーバー" (server), and "搭載" (releases) included in the pattern up4 are included in those included in the transaction F1. Also, since "up" is given to a class of up4, values of an evaluation target item "I社" and class "up" are incremented by "1".

On the other hand, when a transaction F3 and pattern dw5 are selected, since "原産地" (place of origin) and "偽装" (disguised) included in the pattern dw4 are included in items included in the transaction F3, frequencies of occurrence of an evaluation target item "D2社" (company D2) and class "down" are incremented by "1".

Likewise, when a transaction Fm and pattern up8 are selected, frequencies of occurrence of an evaluation target item "D3社" (company D3), class "up", evaluation target item "J社" (company J), and class "up" are incremented by "1".

By making such pattern evaluation for all transactions and patterns, a relationship between evaluation target items and frequencies of occurrence can be obtained, as shown in FIG. 17.

In step Sb9, the evaluation target of interest extraction unit B11 decides and outputs an evaluation target of interest based on frequencies of occurrence calculated by evaluating transactions using respective patterns.

For example, the number of targets of interest to be extracted is set, and as many evaluation target items with higher frequencies of occurrence as the set number of targets can be output in turn. In this case, when the top three are extracted as targets of interest from the relationship between the evaluation target items and frequencies of occurrence shown in FIG. 17, evaluation target items "D3社" (company D3), "D2社" (company D2), and "I社" (company I) can be output as evaluation targets of interest by referring to the frequencies of occurrence for respective classes. Note that the evaluation target of interest extraction unit B11 may extract items having frequencies of occurrence higher than a reference value in place of some top items.

As described above, an evaluation target of interest can be decided on based on a pattern discovery and evaluation target of interest extraction apparatus from composite event time series data of claim 2.

The evaluation target of interest extraction apparatus of the second embodiment is not limited to the second embodiment, and can be used with the following modifications described in [1] to [6] below.

[1] For example, in steps Sa11 and Sa12 of FIG. 2, a class is selected, and patterns are discovered based on a partial set of transactions divided based on the class. However, the present invention is not limited to this, and steps Sa11 and Sa12 of FIG. 2 execute processing based on an FP-tree and FP-growth to discover patterns from class-attached transactions without dividing the transactions using an algorithm described in a reference: Shigeaki Sakurai, "Discovery of Frequent Patterns from Item Sets with their Classes", The 24th Annual Conference of the Japanese Society for Artificial Intelligence, 2010, 2A3-4, <https://kaigi.org/jsai/webprogram/2010/pdf/10.pdf>.

Further, the pattern discovery unit B7 generates an FP-tree which stores item sets included in class-attached transactions in a tree structure format by this algorithm. Note that in the FP-tree for class-attached item sets, an area for storing pattern classes corresponding to patterns, a flag used to identify whether a pattern is a feature pattern or possibility pattern, and a flag indicating whether or not a degree of pattern feature support is equal to or more than a minimum degree of support are added to a header of the FP-tree. After generation of the FP-tree, the pattern discovery unit B7 executes the FP-growth of this algorithm to generate an item partial set conditioned by a specific item from the FP-tree, and further generates an FP-tree from the item partial set. The pattern discovery unit B7 recursively repeats generation of an FP-tree and that of an item partial set, thereby discovering patterns.

[2] In step Sa9 of FIG. 2, three divided classes are obtained using one class distinguishing threshold. Using a plurality of class distinguishing thresholds, four or more divided classes can be obtained.

[3] In step Sb8 of FIG. 14, frequencies of occurrence of all evaluation target items corresponding to a transaction including a pattern are incremented by "1". However, when a plurality of evaluation target items are extracted from one transaction, a value normalized using the number of evaluation target items as a weight can be used as an increment.

[4] For evaluation target items which appear in both of a pattern and transaction, frequencies of occurrence may be incremented using a larger weight than those which appear in only a transaction.

[5] In step Sb9 of FIG. 14, evaluation targets of interest are decided based on frequencies of occurrence for respective classes. However, since a total evaluation value is calculated by incrementing frequencies of occurrence of individual classes, evaluation targets of interest may be decided using the evaluation value.

[6] In FIG. 14, after all the transactions are processed, evaluation targets of interest are output. Alternatively, pattern evaluation may be made for each transaction, and evaluation target items corresponding to a transaction including a pattern may be output as targets of interest.

As described above, according to this embodiment, a pattern is applied to a classless transaction to evaluate whether or not the classless transaction includes the pattern. As a result of evaluation, if the transaction includes the pattern, frequencies of occurrence associated with evaluation target items in the classless transaction are incremented, and evaluation target items associated with the frequencies of occurrence are extracted as evaluation targets of interest based on the increment results of the frequencies of occurrence, thus obtaining the same effects as in the first embodiment.

Unlike a transaction for pattern discovery, since a classless transaction which does not include any class is generated, a transaction can be generated at high speed.

According to at least one embodiment described above, a plurality of items are extracted for each piece of collected text information, and when an item, which matches an evaluation target expression or related expression, of the items is found, the evaluation target expression or that associated with the related expression is allocated to the text information as an evaluation target item, a class related to a change in numeric information related to the evaluation target item is distinguished, a class-attached transaction including an evaluation target item, respective items, and a class is generated for each text information, and a pattern indicating a combination of characteristic items is discovered from a set of transactions. With this arrangement, an evaluation target which cannot be characterized in advance can be handled, time series data are not limited to those related to occurrence of an evaluation target, and a pattern can be automatically discovered.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment. Furthermore, the storage medium according to each embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each embodiment on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An evaluation target of interest extraction apparatus configured to discover a pattern before an evaluation target of interest is extracted based on the pattern from a plurality of pieces of text information which are given along a time series and are related to a plurality of evaluation targets, comprising a computer configured to:

collect text time series data including text information delivered among the plurality of pieces of text information, information which shows evaluation targets contained in the text information delivered among the plurality of evaluation targets, and first time information which shows timing at which each text information is delivered via a network;

collect numeric time series data including numeric information which are given along a time series for each evaluation target and individually related to each evaluation target and time information individually related to each numeric information via the network, wherein the time information includes the first time information and second time information which shows timing after timing shown by the first time information in the same time series;

store, in a storage, an evaluation target expression which individually expresses each evaluation target, and a related expression which expresses a target individually related to each evaluation target in association with each other;

extract a plurality of noun expressions for each piece of text information included in the collected text time series data;

allocate the evaluation target expression or an evaluation target expression associated with the related expression in the storage to the text information related to extracted noun expressions as an evaluation target noun expression, when the noun expressions include a noun expression that matches the stored evaluation target expression or the related expression;

obtain first numeric information as numeric information related to a first timing as a delivery timing corresponding to text information to which the evaluation target noun expression is allocated and second numeric information as the numeric information related to a second timing after the first timing in the same time series from numeric time series data corresponding to the evaluation target noun expression, wherein the first timing is shown by the first time information and the second timing is shown by the second time information;

calculate a change in numeric information related to the evaluation target between the first and second timing based on the first and second numeric information which is obtained;

distinguish a class related to the change in the numeric information, and allocate the class to the text information to which the evaluation target noun expression is allocated;

generate, for each piece of collected text information, a class attached transaction including the allocated evaluation target noun expression, the extracted noun expressions, and the allocated class; and discover the pattern indicating a combination of characteristic noun expressions from each of the transactions, the combination of characteristic noun expressions having high frequencies of occurrence.

2. The evaluation target of interest extraction apparatus of claim 1, wherein the computer is further configured to:

generate a classless transaction, which includes the evaluation target noun expression allocated and the extracted noun expressions, and does not include the class for each text information newly collected after the pattern is stored in the storage;

apply the pattern to the classless transaction to evaluate whether or not the classless transaction includes the pattern; and when the classless transaction includes the pattern as a result of the evaluation, increment a frequency of occurrence associated with the evaluation target noun expression in the classless transaction, and extract an evaluation target noun expression associated with the frequency of occurrence as the evaluation target of interest based on the increment result of the frequency of occurrence.

3. A non-transitory computer readable storage medium storing a computer program executed by a processor of an evaluation target of interest extraction apparatus, which comprises a target expression storage device and a pattern storage device and is configured to discover a pattern before an evaluation target of interest is extracted based on the pattern from a plurality of pieces of text information which are given along a time series and are related to a plurality of evaluation targets, the program comprising:

a first program code for controlling the processor to execute processing for collecting text time series data including text information delivered among the plurality of pieces of text information, information which shows evaluation targets contained in the text information delivered among the plurality of evaluation targets, and first time information which shows a timing at which each text information is delivered;

a second program code for controlling the processor to execute processing for collecting numeric time series data including numeric information which are given along a time series for each evaluation target and individually related to each evaluation target and time information individually related to each numeric information, wherein the time information includes the first time information and second time information which shows timing after timing shown by the first time information in the same time series;

a third program code for controlling the processor to execute processing for storing an evaluation target expression which individually expresses each evaluation target, and a related expression which expresses a target individually related to each evaluation target in association with each other in the target expression storage device;

a fourth program code for controlling the processor to execute processing for extracting a plurality of noun expressions for each piece of text information included in the collected text time series data, and for allocating the evaluation target expression or an evaluation target expression associated with the related expression in the target expression storage device to the text information related to extracted noun expressions as an evaluation target noun expression, when the noun expressions include a noun expression that matches the stored evaluation target expression or the related expression;

a fifth program code for controlling the processor to execute processing for obtaining first numeric information as numeric information related to a first timing as a delivery timing corresponding to text information to which the evaluation target noun expression is allocated and second numeric information as the numeric information related to a second timing after the first timing in the same time series from numeric time series data corresponding to the evaluation target noun expression, wherein the first timing is shown by the first time information and the second timing is shown by the second time information; calculating a change in numeric information related to the evaluation target between the first and second timing based on the first and second numeric information which is obtained, distinguishing a class related to the change in the numeric information, and allocating the class to the text information to which the evaluation target noun expression is allocated;

a sixth program code for controlling the processor to execute processing for generating, for each piece of collected text information, a class attached transaction including the allocated evaluation target noun expression, the extracted noun expressions, and the allocated class; and a seventh program code for controlling the processor to execute processing for discovering the pattern indicating a combination of characteristic noun expressions from each of the transactions, the combination of characteristic noun expressions having high frequencies of occurrence and storing the discovered pattern in the pattern storage device.

* * * * *